United States Patent
Johann et al.

(10) Patent No.: US 6,514,751 B2
(45) Date of Patent: *Feb. 4, 2003

(54) LINEAR MICROARRAYS

(75) Inventors: Timothy W. Johann, Sunnyvale, CA (US); Sang Chul Park, San Jose, CA (US)

(73) Assignee: Incyte Genomics, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/933,570

(22) Filed: Aug. 20, 2001

(65) Prior Publication Data

US 2002/0072065 A1 Jun. 13, 2002

Related U.S. Application Data

(63) Continuation of application No. 09/165,465, filed on Oct. 2, 1998, now Pat. No. 6,277,628.

(51) Int. Cl.[7] .............. C12Q 1/68; C12P 19/34; C12M 1/34; C07H 21/02; C07H 21/04

(52) U.S. Cl. .............. 435/287.2; 435/6; 435/7.1; 435/91.1; 435/91.2; 536/22.1; 536/23.1; 536/24.3; 536/24.31; 536/24.32; 536/24.33

(58) Field of Search .............. 435/6, 7.1, 91.1, 435/91.2, 287.2; 536/22.1, 23.1, 24.3–24.33

(56) References Cited

U.S. PATENT DOCUMENTS

| 5,514,550 A | 5/1996 | Findlay et al. |
| 5,804,384 A | 9/1998 | Muller et al. |
| 5,807,522 A | 9/1998 | Brown et al. |

FOREIGN PATENT DOCUMENTS

| WO | 95/25116 | 3/1995 |
| WO | 95/35505 | 6/1995 |

*Primary Examiner*—Jeffrey Siew
(74) *Attorney, Agent, or Firm*—Richard Aron Osman

(57) ABSTRACT

The present invention provides a method and a composition for detecting the levels of a plurality of biomolecular probes in a sample. In particular, the invention relates to a hybridization composition for detecting the presence or levels of different polynucleotide sequences in a sample.

22 Claims, 4 Drawing Sheets

LINEAR MICROARRAYS

CROSS-REFERENCE TO RELATED APPLICATION

This application is a continuing application of and claims priority under 35 U.S.C.§120 to Ser. No. 09/165,465, filed Oct. 2, 1998, U.S. Pat. No. 6,277,628, having the same title and inventors, which is incorporated herein by reference.

FIELD OF THE INVENTION

The present invention provides a method and a composition for detecting the levels of a plurality of biomolecular probes in a sample.

BACKGROUND OF THE INVENTION

DNA-based arrays can provide a simple way to explore the expression of a single polymorphic gene or a large number of genes. When the expression of a single gene is explored, DNA-based arrays are employed to detect the expression of specific gene variants. For example, a p53 gene array is used to determine whether individuals are carrying mutations that predispose them to cancer. Alternatively, a P450 gene array is used to determine whether individuals have one of a number of specific mutations that could result in increased drug metabolism, drug resistance or drug toxicity.

DNA-based array technology is especially relevant to the rapid screening of expression of a large number of genes. There is a growing awareness that gene expression is affected in a global fashion. A genetic predisposition, disease or therapeutic treatment may affect, directly or indirectly, the expression of a large number of genes. In some cases a relationship between a disease or therapeutic treatment and the expression of particular genes may be expected, such as where the genes are known to be part of a signaling pathway implicated in a disease. In other cases, such as when the genes' function is unidentified or the genes participate in separate signaling pathways, the relationship between a disease and particular genes may be unexpected. Therefore, DNA-based arrays can be used to investigate how genetic predisposition, disease, or therapeutic treatment may affect the expression of individual genes or a group of genes.

SUMMARY OF THE INVENTION

The present invention provides a hybridization composition for detecting the levels of a plurality of biomolecular probes in a sample. The composition comprises (a) a capillary-like casing; and (b) a substrate immobilized in said casing. The substrate's surface contains a plurality of regions arranged in a defined manner with respect to the length of said casing and each of the regions has one or more different immobilized target. Additionally, the substrate's surface is in close proximity with the inner surface of said casing so as to minimize the ratio of liquid volume contained within said casing to the substrate's surface area. The linear density of the plurality of defined regions is greater than 1/cm, preferably is greater than $1 \times 10^3$/cm, and more preferably is greater than $1 \times 10^6$/cm.

In one preferred embodiment, the biomolecular probes comprise polynucleotide probes in a sample and the targets are complementary polynucleotide sequences. In another preferred embodiment, the ratio of liquid volume contained within said casing to hybridization surface area is less than about $1 \times 10^{-5}$ m, preferably less than $1 \times 10^{-7}$ m, more preferably less than $1 \times 10^{-9}$ m. In yet another preferred embodiment, the substrate is a plurality of beads whose diameters approximate the inner diameter of the capillary-like casing. In a another preferred embodiment, the substrate is a rod whose diameter approximates the inner diameter of the capillary-like casing. Typically, the diameter of the substrate is more than 90%, preferably more than 95%, of the inner diameter of the capillary-like casing. In a further embodiment, the substrate is an agarose plug flush against the inner surface of the capillary-like casing.

The present invention also provides a method for detecting the levels of a plurality of biomolecular probes in a sample. The method comprises (i) contacting the sample comprising the plurality of biomolecular probes with a hybridization composition comprising (a) a capillary-like casing and (b) a substrate immobilized in said casing under conditions effective to form hybridization complexes between biomolecular probes and immobilized targets; and (ii) detecting the hybridization complexes.

DESCRIPTION OF THE INVENTION

The present invention provides a hybridization composition which is useful in hybridization reactions where high throughput hybridization experiments utilizing small sample volumes are desired. The composition allows for hybridization experiments to be performed with sample volumes that are substantially less than those used today in microarray hybridization experiments. Typically, in experiments using two-dimensional microarrays, volumes for sample delivery, hybridization or washes are required in the range of 12 to 200 microliters. In contrast, when the present invention is employed, volumes in the range of 10 nanoliters to 10 microliters are necessary for sample delivery, hybridization or washes.

The invention is a composition comprising one or more capillary-like casings with one or more input openings and one or more output openings and a substrate immobilized in each of said capillary-like casings. A key feature of the invention is that the substrate's surface is in close proximity with the inner surface of the capillary casing so as to minimize the ratio of liquid volume contained within said casing to the substrate's surface area. In this manner the volume for sample delivery and hybridization reactions is minimized. Typically, for two-dimensional microarrays the ratio of sample volume to surface area is about $1 \times 10^{-5}$ m. In contrast, the present invention provides for ratios of sample volume to hybridization surface area less than $1 \times 10^{-5}$ m, preferably less than $1 \times 10^{-7}$ m, and more preferably less than $1 \times 10^{-9}$ m. The ratios can be varied by changing, for example, the inner diameter of the capillary-like casing or the surface area of the substrate.

Figure 1:
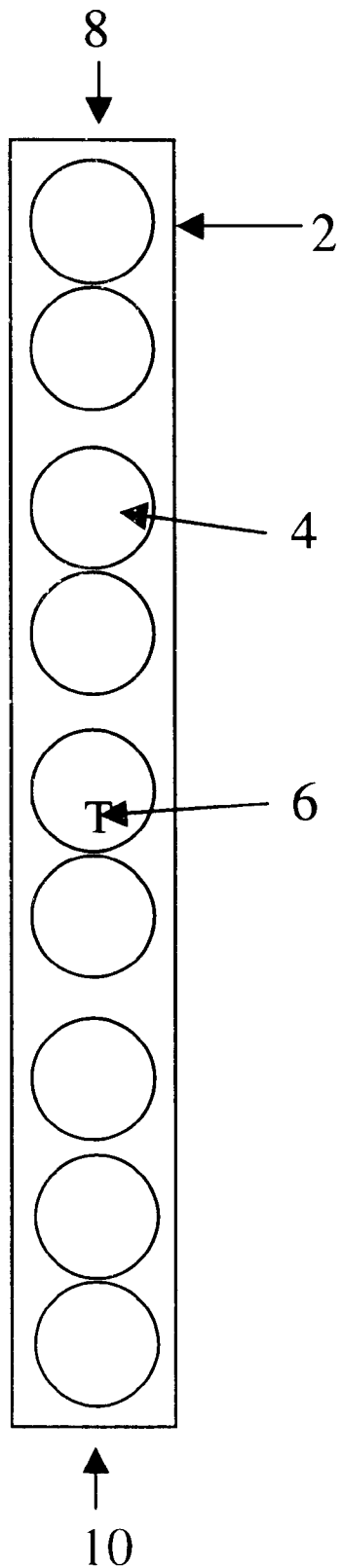
FIG. 1 illustrates a cross-sectional view of one embodiment of the invention, where the hybridization composition comprises a substrate comprising a plurality of beads.

One preferred embodiment of the present invention is illustrated in FIG. 1. In this embodiment, the capillary-like casing is a capillary tube 2 and the substrate comprises a plurality of beads, such as bead 4. Each bead has at least one type of immobilized target, such as immobilized target 6, on its surface. A key feature of the invention is that each bead is localized in defined locations along the length of the casing, such that the hybridization composition is defined by having a linear density of different polynucleotide sequences of at least 1/cm, preferably at least $1\times10^3$/cm, more preferably greater than $1\times10^6$/cm. Additionally, the inner diameter of the capillary and the diameter of the bead are selected to be substantially similar. This means the diameter of the bead is more than 90%, preferably more than 95%, and more preferably more than 98%, the length of the inner diameter of the capillary-like casing. Samples, prehybridization buffers, hybridization buffers, and washes flow into the hybridization composition through either first 8 or second 10 open ends and flow out, preferably, through the opposite end.

Figure 2:
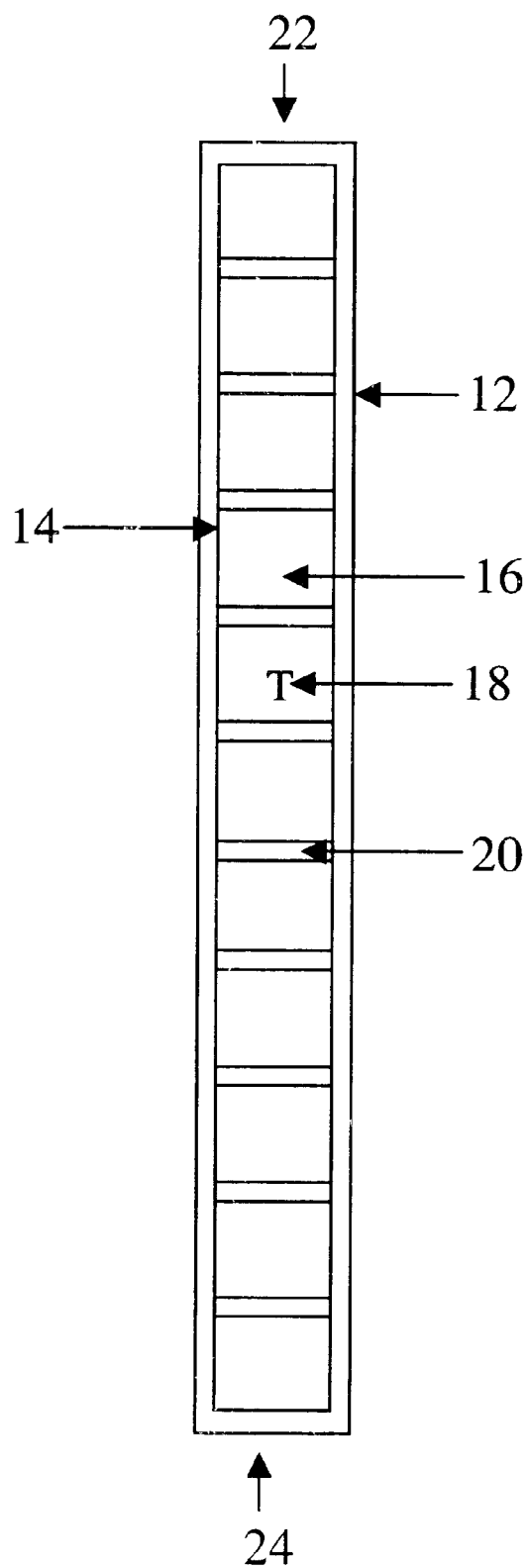
FIG. 2 illustrates a cross-sectional view of a second embodiment of the invention, where the hybridization composition comprises a substrate comprising a plurality of defined regions perpendicular to the length of a rod.

A second preferred embodiment is illustrated in FIG. 2. In this second embodiment, the capillary-like casing is a capillary tube 12 and the substrate comprises a rod 14 coextensive with the capillary tube. The rod may comprise bands, such as band 16 containing at least one type of immobilized target, such as target 18. Band regions containing different immobilized targets may alternate with bands lacking a target, such as unmodified band 20. Again, the hybridization composition is defined by having a linear density of different polynucleotide sequences of at least 1/cm, preferably at least $1\times10^3$/cm, more preferably greater than $1\times10^6$/cm. Additionally, the inner radius of the capillary tube and the outer radius of the rod are substantially similar. Samples, prehybridization buffers, hybridization buffers, or washes flow into the hybridization composition through either first 22 or second 24 open ends and flow out, preferably, through the opposite end. Alternatively, the substrate may comprise alternating agarose plugs modified by at least one target and unmodified agarose plugs.

Figure 3:
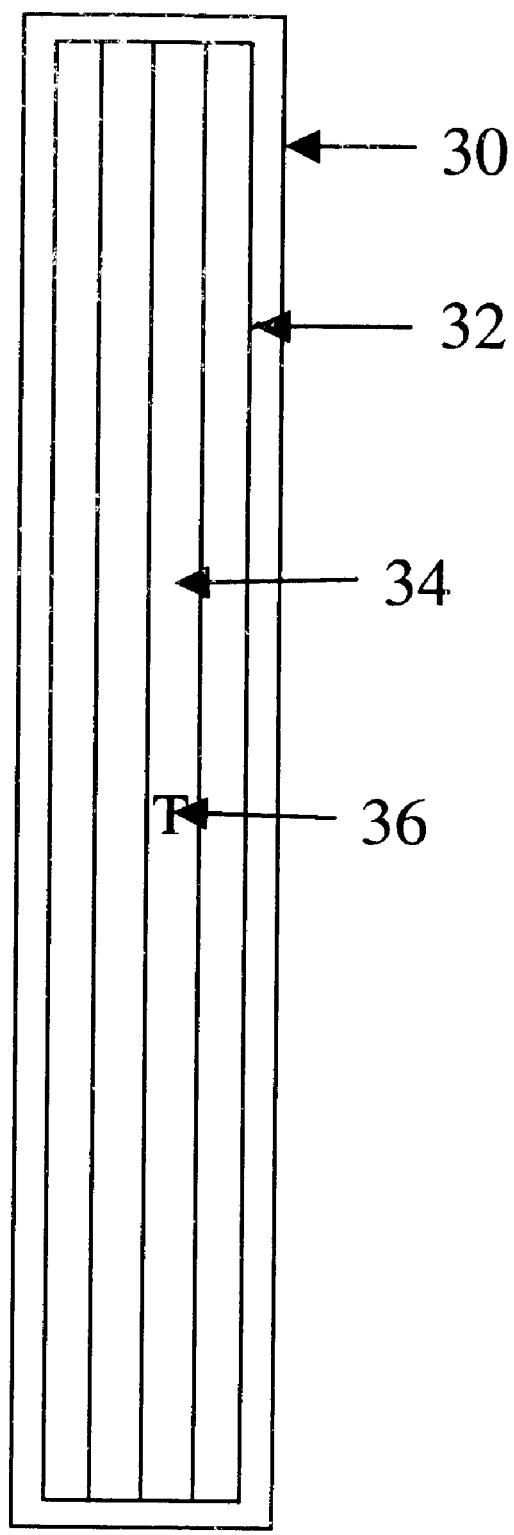
FIG. 3 illustrates a cross-sectional view of a third embodiment of the invention, where the hybridization composition comprises a substrate comprising a plurality of defined regions parallel to the length of a rod.

A third embodiment is illustrated in FIG. 3. In this instance, the capillary-like casing is a capillary tube 30 and the substrate comprises a rod 32 coextensive with the capillary tube. In this case, however, instead of having defined regions, such as defined region 34, running perpendicular to the length of the casing, the discrete regions run in parallel to the length of the casing. Again, each defined region may contain one or more immobilized targets, such as target 36. Alternatively, the substrate may comprise a plurality of rods containing different polynucleotide sequences in defined regions along the length of the casing.

Figure 4:
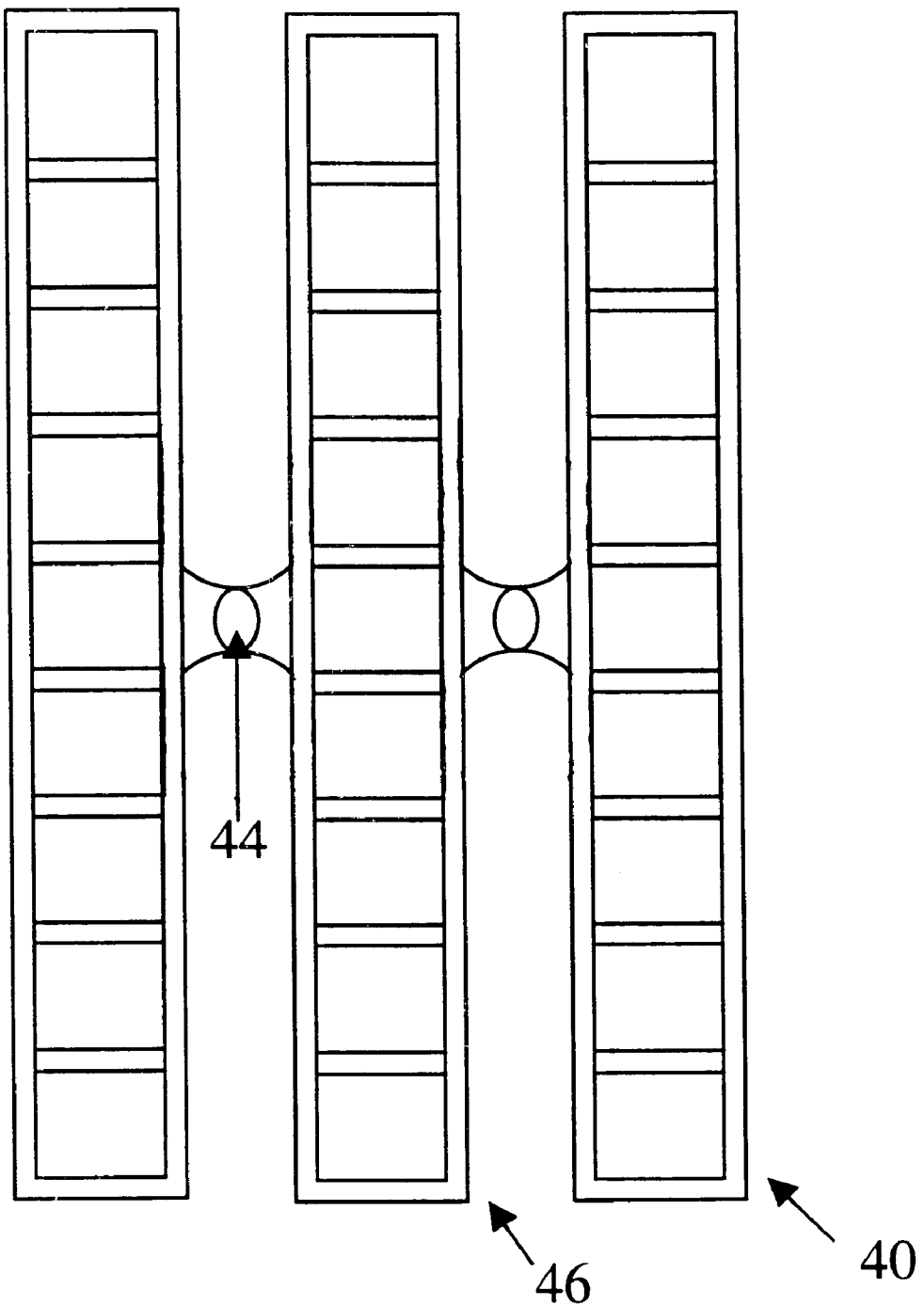
FIG. 4 illustrates a cross-sectional view of yet another embodiment of the present invention, wherein the invention comprises a plurality of hybridization compositions.

FIG. 4 illustrates how the present invention is implemented in a format where a plurality of hybridization compositions are employed at the same time. As shown in FIG. 4, three hybridization compositions, such as hybridization composition 40, is connected to one or more neighboring hybridization compositions to form a two-dimensional arrangement 42. Alternatively, the hybridization compositions can be in a three-dimensional arrangement. Connections, such as valve 44, between neighboring hybridization compositions 40 and 46 can be in an open or closed position. When connections are in a closed position, different hybridizing compositions can be subjected to different samples and/or hybridizing conditions. The dimensions of the capillary-like casing, the substrate, the defined regions or the immobilized targets are not drawn to scale in FIGS. 1 through 4.

The capillary-like casings are preferably capillaries, cylinders and the like and are preferably optically transparent. Additionally, the casings preferably have low autofluorescence. The substrate may be porous, solid, rigid, corrugated, layered or semi-rigid. The substrate is preferably optically transparent and has a low autofluorescence. Preferably, the substrate comprises beads or rods or plugs of 1 mm in diameter, preferably 100 microns, more preferably less than 10 microns, and even more preferably less than 1 micron in diameter.

For example, as illustrated in Table 1, if beads with a radius of $5\times10^{-7}$ m (diameter=1 micron) are selected and the inner radius of the capillary is about 5% larger than the bead radius, then the ratio of hybridization volume to surface area can be reduced to $1.09\times10^{-7}$ m.

TABLE 1

| Bead radius (m) | Bead surface area (m$^2$) | Capillary interior volume (m$^3$) | Hybridization volume (m$^3$) | Hybridization volume/Surface area (m) |
| --- | --- | --- | --- | --- |
| $5\times10^{-7}$ | $3.14\times10^{-12}$ | $3.42\times10^{-15}$ | $8.66\times10^{-19}$ | $1.09\times10^{-7}$ |
| $5\times10^{-6}$ | $3.14\times10^{-10}$ | $3.42\times10^{-12}$ | $8.66\times10^{-16}$ | $1.09\times10^{-6}$ |
| $5\times10^{-5}$ | $3.14\times10^{-8}$ | $3.42\times10^{-9}$ | $8.66\times10^{-13}$ | $1.09\times10^{-5}$ |
| $5\times10^{-4}$ | $3.14\times10^{-6}$ | $3.42\times10^{-6}$ | $8.66\times10^{-10}$ | $1.09\times10^{-4}$ |

As illustrated in Table 2, if an inner rod with a radius of $5\times10^{-7}$ m (diameter=1 micron) is selected and the inner radius of the capillary is about 5% larger than the rod radius, then the ratio of hybridization volume to surface area can be reduced to $2.56\times10^{-8}$ m.

TABLE 2

| Inner capillary radius (m) | Inner capillary surface area (m$^2$) | Capillary interior volume (m$^3$) | Hybridization volume (m$^3$) | Hybridization volume/Surface area (m) |
| --- | --- | --- | --- | --- |
| $5\times10^{-7}$ | $3.14\times10^{-12}$ | $8.05\times10^{-16}$ | $8.66\times10^{-19}$ | $2.56\times10^{-8}$ |
| $5\times10^{-6}$ | $3.14\times10^{-10}$ | $8.05\times10^{-13}$ | $8.66\times10^{-16}$ | $2.56\times10^{-7}$ |
| $5\times10^{-5}$ | $3.14\times10^{-8}$ | $8.05\times10^{-10}$ | $8.66\times10^{-13}$ | $2.56\times10^{-6}$ |
| $5\times10^{-4}$ | $3.14\times10^{-6}$ | $8.05\times10^{-7}$ | $8.66\times10^{-10}$ | $2.56\times10^{-5}$ |

The substrates can be coated or bonded with a polymeric film or a polymer layer. In one embodiment, a glass rod is coated evenly with a substance that gives the slide an even binding surface that is positively charged, such as amino silane or polylysine. In another embodiment, a substrate is coated with a polymer layer which contributes reactive groups, such as epoxide groups, for chemical coupling of polynucleotide sequences.

Immobilized on a plurality of defined regions of the substrate's surface, are localized multiple copies of one or more polynucleotide sequences, preferably copies of a single polynucleotide sequence. A polynucleotide refers to a chain of nucleotides. Preferably, the chain has from 5 to 10,000 nucleotides, more preferably from 15 to 3,500 nucleotides.

The plurality of defined regions on the substrate can be arranged in a variety of formats. For example, the regions may be arranged perpendicular or in parallel to the length of the casing. These immobilized copies of a polynucleotide sequence are suitable for use as a target polynucleotide in hybridization experiments. Furthermore, the probes do not have to be directly bound to the substrate, but rather can be bound to the substrate through a linker group. The linker groups may typically vary from about 6 to 50 atoms long. Preferred linker groups include ethylene glycol oligomers, diamines, diacids and the like. Reactive groups on the substrate surface react with one of the terminal portions of the linker to bind the linker to the substrate. The other terminal portion of the linker is then functionalized for binding the polynucleotides.

To prepare beads coated with immobilized polynucleotide sequences, beads are immersed in a solution containing the desired polynucleotide sequence and then immobilized on the beads by covalent or noncovalent means. Alternatively, when the polynucleotides are immobilized on rods, a given polynucleotide can be spotted at defined regions of the rod. Typical dispensers include a micropipette delivering solution to the substrate with a robotic system to control the position of the micropipette with respect to the substrate. There can be a multiplicity of dispensers so that reagents can be delivered to the reaction regions simultaneously. In one embodiment, a microarray is formed by using ink-jet technology based on the piezoelectric effect, whereby a narrow tube containing a liquid of interest, such as oligonucleotide synthesis reagents, is encircled by an adapter. An electric charge sent across the adapter causes the adapter to expand at a different rate than the tube and forces a small drop of liquid onto a substrate (Baldeschweiler et al. PCT publication WO95/251116).

Samples may be any sample containing polynucleotides (polynucleotide probes) of interest and obtained from any bodily fluid (blood, urine, saliva, phlegm, gastric juices, etc.), cultured cells, biopsies, or other tissue preparations. DNA or RNA can be isolated from the sample according to any of a number of methods well known to those of skill in the art. For example, methods of purification of nucleic acids are described in *Laboratory Techniques in Biochemistry and Molecular Biology: Hybridization With Nucleic Acid Probes. Part I. Theory and Nucleic Acid Preparation*, P. Tijssen, ed. Elsevier (1993). In a preferred embodiment, total RNA is isolated using the TRIzol total RNA isolation reagent (Life Technologies, Inc., Rockville, Md.) and RNA is isolated using oligo d(T) column chromatography or glass beads. After hybridization and processing, the hybridization signals obtained should reflect accurately the amounts of control target polynucleotide added to the sample.

Sample polynucleotides may be labeled with one or more labeling moieties to allow for detection of hybridized probe/target polynucleotide complexes. The labeling moieties can include compositions that can be detected by spectroscopic, photochemical, biochemical, bioelectronic, immunochemical, electrical, optical or chemical means. The labeling moieties include radioisotopes, such as $^{32}P$, $^{33}P$ or $^{35}S$, chemiluminescent compounds, labeled binding proteins, heavy metal atoms, spectroscopic markers, such as fluorescent markers and dyes, magnetic labels, linked enzymes, mass spectrometry tags, spin labels, electron transfer donors and acceptors, biotin, and the like.

Labeling can be carried out during an amplification reaction, such as polymerase chain reaction and in vitro or in vivo transcription reactions. Alternatively, the labeling moiety can be incorporated after hybridization once a probe-target complex has formed. In one preferred embodiment, biotin is first incorporated during an amplification step as described above. After the hybridization reaction, unbound nucleic acids are rinsed away so that the only biotin remaining bound to the substrate is that attached to target polynucleotides that are hybridized to the polynucleotide probes. Then, an avidin-conjugated fluorophore, such as avidin-phycoerythrin, that binds with high affinity to biotin is added.

Hybridization causes a polynucleotide probe and a complementary target to form a stable duplex through base pairing. Hybridization methods are well known to those skilled in the art. Stringent conditions for hybridization can be defined by salt concentration, temperature, and other chemicals and conditions. Varying additional parameters, such as hybridization time, the concentration of detergent (sodium dodecyl sulfate, SDS) or solvent (formamide), and the inclusion or exclusion of carrier DNA, are well known to those skilled in the art. Additional variations on these conditions will be readily apparent to those skilled in the art (Wahl, G. M. and S. L. Berger (1987) *Methods Enzymol.* 152:399–407; Kimmel, A. R. (1987) *Methods Enzymol.* 152:507–511; Ausubel, F. M. et al. (1997) *Short Protocols in Molecular Biology*, John Wiley & Sons, New York, N.Y.; and Sambrook, J. et al. (1989) *Molecular Cloning. A Laboratory Manual*, Cold Spring Harbor Press, Plainview, N.Y.).

In a preferred embodiment, hybridization is performed with buffers, such as 5×SSC with 0.1% SDS at 25° C. Subsequent washes may be performed at higher stringency with buffers, such as 0.5×SSC with 0.1% SDS at 25° C. Stringency can also be increased by adding agents such as formamide. Background signals can be reduced by the use of detergent, such as SDS or Triton X-100, or a blocking agent, such as salmon sperm DNA or bovine serum albumin.

Hybridization reactions can be performed in absolute or differential hybridization formats. In the absolute hybridization format, polynucleotide probes from one sample are hybridized to the target sequences and signals detected after hybridization complex formation correlate to polynucleotide probe levels in a sample. In the differential hybridization format, the differential expression of a set of genes in two biological samples is analyzed. For differential hybridization, polynucleotide probes from both biological samples are prepared and labeled with different labeling moieties. A mixture of the two labeled polynucleotide probes is added to a microarray. After hybridization and washing, the microarray is examined under conditions in which the emissions from the two different labels are individually detectable. Probes in the microarray that are hybridized to substantially equal numbers of target polynucleotides derived from both biological samples give a distinct combined fluorescence (Shalon et al. PCT publication WO95/35505). In a preferred embodiment, the labels are fluorescent labels with distinguishable emission spectra, such as Cy3/Cy5 fluorophores (Amersham Pharmacia Biotech, Piscataway, N.J.). After hybridization, the microarray is washed to remove nonhybridized nucleic acids and complex formation between the hybridizable array elements and the target polynucleotides is detected.

Methods for detecting complex formation are well known to those skilled in the art. In a preferred embodiment, the polynucleotide probes are labeled with a fluorescent label and measurement of levels and patterns of complex formation is accomplished by fluorescence microscopy, preferably confocal fluorescence microscopy. An argon ion laser excites the fluorescent label, emissions are directed to a photomultiplier and the amount of emitted light detected and quantitated. The detected signal should be proportional to the amount of probe/target polynucleotide complex at each position of the microarray. The fluorescence microscope can be associated with a computer-driven scanner device to generate a quantitative two-dimensional image of hybridization intensities. The scanned image is examined to determine the abundance/expression level of each hybridized target polynucleotide. In a differential hybridization experiment, polynucleotide probes from two or more different biological samples are labeled with two or more different fluorescent labels with different emission wavelengths. Fluorescent signals are detected separately with different photomultipliers set to detect specific wavelengths. The relative abundances/expression levels of the target polynucleotides in two or more samples is obtained. Typically, microarray fluorescence intensities can be normalized to take into account variations in hybridization intensities when more than one microarray is used under similar test conditions. In a preferred embodiment, individual polynucleotide probe/target complex hybridization intensities are normalized using the intensities derived from internal normalization controls contained on each microarray.

It is understood that this invention is not limited to the particular methodology, protocols, and reagents described, as these may vary. It is also understood that the terminology used herein is for the purpose of describing particular embodiments only, and is not intended to limit the scope of the present invention which will be limited only by the appended claims. The examples below are provided to illustrate the subject invention and are not included for the purpose of limiting the invention.

EXAMPLES

Example 1
Preparation of Epoxide Derivatized Agarose

Ten g of agarose (Life Technologies, Inc., Rockville, Md.) was added into a 250 ml round bottom flask with a stirring bar. Forty mls of toluene and ten 10 mls of 3-glycidoxypropyl-trimethoxysilane (Sigma-Aldrich Corporation, St Louis, Mo.) were added. The resulting mixture was stirred for 10 minutes. 1 ml of N,N-diisopropylethylamine (Sigma-Aldrich Corporation) was added by a 5 ml syringe and the resulting mixture was stirred and heated (85° C.) for 65 hours. The reaction flask was then cooled to room temperature. The epoxide coated agarose was washed with 100 ml of toluene followed by washes with 100 ml of ethanol, then 100 ml of hexane, then with 100 ml of acetone. The epoxide derivatized agarose was dried under the vacuum for 2 hours and stored in a desiccator prior to use. A similar procedure was used to derivatize glass beads.

Example 2
Preparation of Agarose Plug Array

A YP3 59mer labeled at the 3'-end with a Cy3 fluorescent dye was purchased from Operon Technologies, Alameda, Calif. The modified polynucleotide was dissolved in water at a concentration of 150 uM. 10 ul of the polynucleotide solution was mixed with 10 mg of the epoxide derivatized agarose. 20 ul of water was added and the resulting slurry was heated at 40° C. for 20 minutes. 970 ul of 1 M MOPS was added and the slurry boiled until the agarose dissolved. The agarose was then poured onto a surface and allowed to set. The agarose sheet was then cut into bands. Alternating bands of this DNA linked agarose and plain 1% agarose were then plugged into capillaries. The resulting agarose plug array was about 1 mm in diameter and 5 cm long. The array contained bands of different DNA species that were 2 to 4 mm long. One or more capillaries were then glued to glass slides for ease of handling.

Example 3
Preparation of Glass Bead Array

The same modified polynucleotide was employed. The polynucleotide was dissolved in water at a concentration of 150 uM and further diluted to 0.5 mg/ml in 0.1% SDS. Epoxide-coated glass beads were immersed in this solution, mixed by vortexing, and then poured out on a petri dish. Beads were allowed to dry overnight. They were then washed once with 5×SSC/0.1% SDS, once with 0.5×SSC/0.1% SDS, and once with 0.1% SDS. Beads were dried under vacuum. A capillary tube with a 0.525 mm radius was packed with the 0.5 mm beads separated by alternating unmodified beads. In order to keep the beads from falling out of the capillary, plastic shims (pipette tips, purchased from E&K) were inserted into the ends. Capillaries were then glued to glass slides for ease of handling.

Example 4
Hybridization Using the Agarose Plug Array

The array, attached to its glass slide, was immersed in an electrophoresis chamber filled with 1 M MOPS with the capillary parallel to the electric field. One microliter of a 400 uM solution of a Cy5-5'-labeled 59mer was added to the end of an agarose plugged capillary. The sequence of this second polynucleotide was complementary to the agarose-immobilized polynucleotide.

A potential of 40 volts was applied to the chamber for two hours. Over this time the Cy5-labeled polynculeotide was observed to move through the capillary array. The array was then removed from the chamber and scanned with a confocal fluorescence microscope using a Cy3 and Cy5 detection system. The Cy5-labeled polynucleotide was found to localize only in regions where complementary Cy3-labeled polynucleotide was immobilized.

Example 5
Hybridization Using the Glass Bead Array 100 ul of a 4 uM Cy5-5'-labeled 59mer in 5×SSC, 0.1% SDS was used to fill a bead capillary array. The array was then incubated for 2 hours at 60° C. It was then washed in succession with 200 ul 5×SSC, 0.1% SDS, 200 ul 0.5×SSC, 0.1% SDS, and 200 ul 0.1% SDS. The array was then dried under vacuum and scanned with a confocal fluorescence microscope using a Cy3 and Cy5 detection system. The Cy5-labeled polynucleotide was found to localize in regions where complementary Cy3-polynucleotide derivatized agarose was present.

What is claimed is:

1. A device for detecting a plurality of biomolecular probes in a sample, said device comprising a vessel comprising:

(a) a casing having an inner surface and input and output openings, (b) a nonporous substrate having an outer surface and contained within said casing, (c) a liquid sample comprising biomolecular probes and contained within said casing, wherein the substrate outer surface contains a plurality of regions arranged in a defined manner and each of said regions has a different one of a plurality of immobilized specific binding targets which specifically bind a corresponding one of the plurality of the biomolecular probes, and said substrate outer surface is in close proximity with the inner surface of said casing so as to minimize the ratio of the liquid sample volume contained within said casing to the substrate outer surface area, yet permit flow of the liquid sample from the input opening, between the substrate outer surface and the casing inner surface, and to the output opening, wherein the vessel is one of a plurality of vessels arranged in a two-dimensional arrangement.

2. The device of claim 1, wherein the vessel is one of a plurality of vessels arranged in a three-dimensional arrangement.

3. The device of claim 1, wherein the vessel is one of a plurality of vessels arranged in parallel.

4. The device of claim 1, wherein the vessel is one of a plurality of vessels arranged in parallel, in a three-dimensional arrangement.

5. The device of claim 1, wherein the immobilized binding targets and corresponding biomolecular probes comprise polynucleotides which specifically bind by hybridization.

6. The device of claim 1, wherein the ratio of the liquid sample volume contained within the casing to the substrate outer surface area is less than about $1 \times 10^{-3}$ m.

7. The device of claim 1, wherein the ratio of the liquid sample volume contained within the casing to the substrate outer surface area is less than about $1 \times 10^{-5}$ m.

8. The device of claim 1, wherein the ratio of the liquid sample volume contained within the casing to the substrate outer surface area is less than about $1 \times 10^{-9}$ m.

9. The device of claim 1, wherein the substrate is elongate and has a length and the regions are arranged with a linear density of greater than $1 \times 10^3$ regions per centimeter of the length.

10. The device of claim 1, wherein the substrate is elongate and has a length and the regions are arranged with a linear density of greater than $1 \times 10^6$ regions per centimeter of the length.

11. The device of claim 1, wherein the substrate is selected from the group consisting of an elongate rod less than 10 um in diameter and a plurality of beads, each bead less than 10 um in diameter.

12. A device for detecting a plurality of biomolecular probes in a sample, said device comprising a vessel comprising:

(a) a casing having an inner surface and input and output openings, (b) a nonporous substrate having an outer surface and contained within said casing, (c) a liquid sample comprising biomolecular probes and contained within said casing, wherein the substrate outer surface contains a plurality of regions arranged in a defined manner and each of said regions has a different one of a plurality of immobilized specific binding targets which specifically bind a corresponding one of the plurality of the biomolecular probes, and said substrate outer surface is in close proximity with the inner surface of said casing so as to minimize the ratio of the liquid sample volume contained within said casing to the substrate outer surface area, yet permit flow of the liquid sample from the input opening, between the substrate outer surface and the casing inner surface, and to the output opening, wherein the device is adapted for differential gene expression analysis, wherein the immobilized binding targets and corresponding biomolecular probes comprise polynucleotides which specifically bind by hybridization, and wherein the probes comprise two sets, wherein the probes of each set are derived from a different sample source and comprise a different label.

13. The device of claim 12, wherein the probes of each set comprise a different fluorescent label with distinguishable emission spectra.

14. The device of claim 12, wherein the probes of the two sets comprise Cy3 and Cy5 fluorophores, respectively.

15. The device of claim 12, wherein the ratio of the liquid sample volume contained within the casing to the substrate outer surface area is less than about $1 \times 10^{-3}$ m.

16. The device of claim 12, wherein the ratio of the liquid sample volume contained within the casing to the substrate outer surface area is less than about $1 \times 10^{-5}$ m.

17. The device of claim 12, wherein the ratio of the liquid sample volume contained within the casing to the substrate outer surface area is less than about $1 \times 10^{-9}$ m.

18. The device of claim 12, wherein the substrate is elongate and has a length and the regions are arranged with a linear density of greater than $1 \times 10^3$ regions per centimeter of the length.

19. The device of claim 13, wherein the substrate is elongate and has a length and the regions are arranged with a linear density of greater than $1 \times 10^6$ regions per centimeter of the length.

20. The device of claim 13, wherein the substrate is selected from the group consisting of an elongate rod less than 10 um in diameter and a plurality of beads, each bead less than 10 um in diameter.

21. A method for detecting biomolecular probes in a sample, said method comprising the step of using a device according to claim 1 to detect specific binding of the biomolecular probes to the immobilized targets.

22. A method for detecting biomolecular probes in a sample, said method comprising the step of using a device according to claim 12 to detect specific binding of the biomolecular probes to the immobilized targets.

* * * * *